US012442538B2

(12) United States Patent
Fei et al.

(10) Patent No.: US 12,442,538 B2
(45) Date of Patent: Oct. 14, 2025

(54) OVEN ROTISSERIE

(71) Applicant: Harmonious International Ltd., New Territory (CN)

(72) Inventors: Alex Le-Tien Fei, Los Angeles, CA (US); Shu Hsing Wen, Hong Kong (CN); Le Chun Fei, Hong Kong (CN)

(73) Assignee: Harmonious International Ltd., Tsuen Wan (CN)

( * ) Notice: Subject to any disclaimer, the term of this patent is extended or adjusted under 35 U.S.C. 154(b) by 1047 days.

(21) Appl. No.: 16/431,189

(22) Filed: Jun. 4, 2019

(65) Prior Publication Data

US 2019/0368745 A1 Dec. 5, 2019

Related U.S. Application Data

(60) Provisional application No. 62/680,019, filed on Jun. 4, 2018.

(51) Int. Cl.
*F24C 15/16* (2006.01)
*A21B 1/44* (2006.01)
(Continued)

(52) U.S. Cl.
CPC ........... *F24C 15/164* (2013.01); *A47J 37/041* (2013.01); *A47J 37/0745* (2013.01); *A21B 1/44* (2013.01); *A47J 37/042* (2013.01); *A47J 37/047* (2013.01)

(58) Field of Classification Search
CPC ....... F24C 15/164; F24C 15/16; A47J 37/047; A47J 37/041; A47J 37/042; A47J 37/0745;
(Continued)

(56) References Cited

U.S. PATENT DOCUMENTS 33,453 A * 10/1861 Richards ............... A47J 37/047
34/140
34,968 A * 4/1862 Kelling ................. A47J 37/047
366/247
(Continued)

FOREIGN PATENT DOCUMENTS

DE 3819592 A1 * 12/1989 ........... F16H 31/004
EP 1994865 A1 * 11/2008 ........... A47J 37/041

OTHER PUBLICATIONS

"19th Century French Cast Iron Clockwork Rotisserie Spit Jack. pdf", Web capture of "https://www.lolofrenchantiques.com/store/p22/19th_Century_French_Cast_Iron_Clockwork_Rotisserie_Spit_Jack.html#/"; Lolo French Antiques, 2023. (Year: 2023).*

*Primary Examiner* — Vivek K Shirsat
(74) *Attorney, Agent, or Firm* — The Law Office of Patrick F. O'Reilly III, LLC

(57) ABSTRACT

A system and method for cooking food on a rotisserie in a conventional oven includes setting an oven thermostat to a desired cooking temperature. As spring on a mechanical drive motor is wound and a spit is placed through meat. The spit is then placed on a support to hold the meat in a substantially horizontal position, and the spit is coupled to a mechanical drive motor. The oven rotisserie and meat are placed into the oven to commence a cooking operation. The spit is rotated intermittently via the mechanical drive motor during the cooking operation in accordance with operation of an escapement and gear of the mechanical drive motor. The oven rotisserie and meat are removed from the oven after completion of the cooking operation.

5 Claims, 10 Drawing Sheets

(51) Int. Cl.
*A47J 37/04* (2006.01)
*A47J 37/07* (2006.01)

(58) Field of Classification Search
CPC .... A47J 2037/0795; A47J 37/04; A47J 37/07; A21B 1/44; G05G 5/08; G05G 5/12; G05G 5/18; G05G 5/24
USPC ........ 99/421 H, 334, 371, 427; 126/248, 30, 126/25 AA, 41 B, 14; 74/3.54, 70, 114, 74/575, 606 R
See application file for complete search history.

(56) References Cited

U.S. PATENT DOCUMENTS

| | | | | | |
|---|---|---|---|---|---|
| 218,946 | A * | 8/1879 | Doescher | | G04B 47/006 431/87 |
| 313,003 | A * | 2/1885 | Lakin et al. | | G04F 3/027 185/27 |
| 472,690 | A * | 4/1892 | Baumann | | F16H 29/22 74/114 |
| 548,087 | A * | 10/1895 | Perky | | A47J 37/044 451/328 |
| 629,617 | A * | 7/1899 | Smith | | A23L 3/14 99/371 |
| 783,352 | A * | 2/1905 | Baker | | A23L 3/14 99/371 |
| 850,657 | A * | 4/1907 | Klein | | D06F 37/04 99/421 H |
| 940,557 | A * | 11/1909 | Roe | | A47J 37/047 99/409 |
| 977,130 | A * | 11/1910 | Rice et al. | | G04F 3/027 194/251 |
| 990,112 | A * | 4/1911 | Corcoran | | G04F 3/027 194/251 |
| 1,065,870 | A * | 6/1913 | Holdt | | B61H 13/02 74/120 |
| 1,118,471 | A * | 11/1914 | Carlton | | A47J 37/0814 99/336 |
| 1,249,293 | A * | 12/1917 | Norwood | | F16K 1/306 251/32 |
| 1,334,876 | A * | 3/1920 | Seymour | | A47J 37/047 68/19 |
| 1,381,243 | A * | 6/1921 | Seymour | | A47J 37/047 219/389 |
| 1,449,316 | A * | 3/1923 | Coyle | | G04F 3/00 340/331 |
| 1,541,472 | A * | 6/1925 | Born | | A47J 37/047 99/421 H |
| 1,733,766 | A * | 10/1929 | Wilkowski | | A47J 37/047 99/427 |
| 1,899,335 | A * | 2/1933 | Kastner | | A21B 3/133 99/427 |
| 1,993,607 | A * | 3/1935 | Kalgren | | A47J 37/047 126/41 B |
| 2,004,775 | A * | 6/1935 | Wright | | A47J 37/047 126/41 B |
| 2,506,546 | A * | 5/1950 | Farrell | | H01H 75/04 335/34 |
| 2,783,705 | A * | 3/1957 | Vrionis | | A47J 37/041 126/30 |
| 2,889,786 | A * | 6/1959 | Maffei | | A21B 1/44 414/158 |
| 2,926,534 | A * | 3/1960 | Fritsch | | G04C 3/061 74/126 |
| 3,068,912 | A * | 12/1962 | Shaw | | A47J 27/14 74/89.22 |
| 3,465,605 | A * | 9/1969 | Hylan | | F16H 31/004 74/567 |
| 3,577,875 | A * | 5/1971 | Stcherbatcheff | | G04C 3/165 968/494 |
| 3,590,656 | A * | 7/1971 | Lloyd, Jr. | | B65H 75/4434 188/82.7 |
| 3,724,248 | A * | 4/1973 | Obermann | | H01H 43/102 74/122 |
| 3,832,989 | A * | 9/1974 | Belford | | A47J 37/0718 126/25 R |
| 3,857,293 | A * | 12/1974 | Godwin | | F16H 31/004 74/125 |
| 4,027,468 | A * | 6/1977 | Felty | | G04B 19/25 368/32 |
| 4,112,832 | A * | 9/1978 | Severdia | | A47J 37/041 185/38 |
| 4,152,954 | A * | 5/1979 | Stout | | G07F 15/12 74/568 T |
| 4,287,396 | A * | 9/1981 | Greenwald | | G07F 15/12 194/353 |
| 4,442,763 | A * | 4/1984 | Beller | | A47J 37/0745 99/449 |
| 4,471,195 | A * | 9/1984 | Ishii | | H05B 6/6411 219/762 |
| 4,770,091 | A * | 9/1988 | Vaughn | | A47J 37/0745 99/449 |
| 5,134,927 | A * | 8/1992 | McCarthy, III | | G07F 17/0085 219/400 |
| 5,226,342 | A * | 7/1993 | Panin | | G05G 5/06 74/577 M |
| 5,632,098 | A * | 5/1997 | Finch | | A23N 12/10 99/421 H |
| 5,771,600 | A * | 6/1998 | Romanow | | A47J 37/049 99/421 H |
| 6,736,050 | B1 * | 5/2004 | Monn | | A47J 37/0704 99/417 |
| 6,736,086 | B2 * | 5/2004 | Kaiser | | G01K 5/70 374/E5.041 |
| RE42,732 | E * | 9/2011 | Zittel | | A23B 7/06 99/348 |
| 9,504,354 | B1 * | 11/2016 | Ficarra | | A47J 37/0713 |
| 10,485,377 | B2 * | 11/2019 | Glucksman | | F24C 7/046 |
| 10,918,242 | B2 * | 2/2021 | Berg | | A47J 37/047 |
| 11,306,921 | B2 * | 4/2022 | Lieftink | | F24B 1/207 |
| 2003/0016589 | A1 | 1/2003 | Lin | | G04G 9/0076 368/21 |
| 2003/0047552 | A1 * | 3/2003 | Hsu | | A47J 37/0664 219/400 |
| 2003/0061899 | A1 * | 4/2003 | Liu | | B60N 2/943 74/575 |
| 2003/0112845 | A1 * | 6/2003 | Kaiser | | G01K 5/70 374/E5.041 |
| 2004/0055477 | A1 * | 3/2004 | Swank | | A21B 3/02 99/419 |
| 2005/0268794 | A1 * | 12/2005 | Nesterov | | F24C 15/164 99/427 |
| 2008/0304371 | A1 * | 12/2008 | Damasko | | G04B 5/08 368/208 |
| 2009/0277339 | A1 * | 11/2009 | Andrade | | A47J 37/047 99/449 |
| 2010/0186602 | A1 * | 7/2010 | Dotan | | A47J 37/041 99/421 H |
| 2011/0045149 | A1 * | 2/2011 | Lee | | A23L 5/10 99/450 |
| 2011/0097468 | A1 * | 4/2011 | Driscoll | | A47J 37/0704 99/450 |
| 2011/0228644 | A1 * | 9/2011 | Chang | | G04B 33/08 368/127 |
| 2012/0092969 | A1 * | 4/2012 | Tedeschi | | G04B 33/10 368/127 |
| 2013/0070570 | A1 * | 3/2013 | Colpo | | G04B 15/14 29/896.3 |
| 2016/0289030 | A1 * | 10/2016 | Tokarz | | G04B 15/08 |
| 2017/0055767 | A1 * | 3/2017 | Brown | | A47J 37/041 |
| 2023/0112856 | A1 * | 4/2023 | Wang | | A47J 37/042 99/443 R |

* cited by examiner

OVEN ROTISSERIE

CROSS-REFERENCE TO RELATED APPLICATIONS

This application claims the benefit of U.S. Provisional Application No. 62/680,019 filed Jun. 4, 2018, which is incorporated herein by reference.

TECHNICAL FIELD

This application relates generally to rotisserie cooking. The application relates more particularly to a rotisserie system configured to operate in a conventional oven, such as a convection oven,

BACKGROUND

Conventional ovens cook food by exposing food surfaces to radiant, heated air over time. Convection ovens add a mechanism, such as a fan, for circulating heated air which may speed cooking time or allow use of a lower temperature setting. Baking is when food stays immobile during a cooking process. Roasting is baking at higher temperature, typically 400° F. (approximately 200° C.), or higher. Broiling is cooking via exposure of food to infrared radiation, such as placing it under an oven burner or over a bed of hot charcoals. Home ovens may provide a mechanism to bake or roast via radiant or convective heat. They may also include a broiler where food can be placed under a flame.

Most home ovens typically operate to cook meats with a user placing it in a roasting pan, which may be covered, setting a desired temperature which is maintained by a thermostat, opening an oven door, inserting the roaster, closing the door and setting a timer for a specified cooking duration.

In cooking larger food items, including poultry, and particularly turkey, the food must be flipped or rotated at least once during the cooking cycle for even cooking. Flipping requires removal of the food from the oven and manually turning the bird before placing it once again in the oven to continue the cooking process.

During cooking, meats typically lose juices which accumulate at the bottom of the roaster. Additionally, during the cooking process, only the underside of the food will be exposed to these juices. Thus, the user may have to periodically remove the roaster and baste a top surface of the food to prevent it from becoming overly dry. This can be done multiple times, including during a flipping procedure. More frequent basting may improve flavor or texture, but requires substantially more user effort and a longer cooking duration due to loss of heating exposure and oven reheating.

BRIEF DESCRIPTION OF THE DRAWINGS

Various embodiments will become better understood with regard to the following description, appended claims and accompanying drawings wherein:

DETAILED DESCRIPTION

Figure 1:
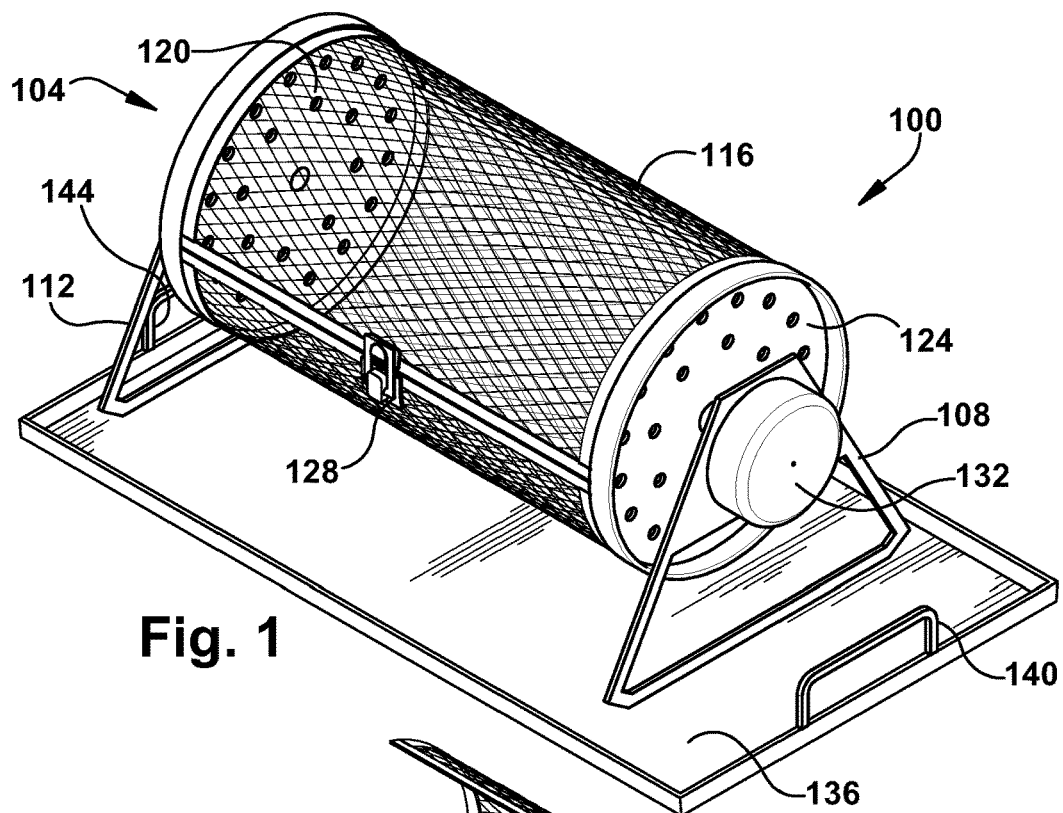
FIG. 1 is a perspective view of an example embodiment of an oven rotisserie comprised of a cylindrical, rotatable cooking cage.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

In addition to oven cooking, as noted above, food can be cooked over an open fire, with the food being suspended over the fire by a support. The food support can include a horizontal support, which may be comprised of a spit. A spit is a long, thin rod, typically metal or wood, pushed through meat in order to hold it while it is roasted over an open fire. A rotisserie is a spit that is rotatable.

Oven cooking can be enhanced by use of a rotisserie, particularly so with one that operates continuously or continually during a cooking process. Rotating meats during the cooking process can assist to maintain juices in the meat longer to enhance flavor. Rotating meat also assures a more even exposure of a food surface to heat, such as its positioning relative to a fixed heating element such as a gas burner or electric cooking element. A rotisserie feature can be built into an oven, such as an electric, countertop rotisserie oven. This requires a user to purchase, clean, maintain and store a dedicated appliance. During use, a significant amount of counter space may be lost due to the size of the appliance. Also, cooking must be done with electricity which can be more expensive to operate than a gas oven. Additionally, a countertop appliance may not have an ability to achieve convection heating nor perform self-cleaning as can a typical home oven.

A typical home oven has no rotisserie available. Example embodiments herein provide a rotisserie system that can be used with a typical, unmodified home oven. A home oven capacity is typically between two and four cubic feet (approximately 56-113 liters). A compact oven may be between one and two cubic feet (approximately 28-56 liters). Example embodiments herein comprise rotisserie systems sized to fit with the available space of an existing homeowner's oven. Rotation is accomplished by stored, mechanical energy such as by winding of spring which can power rotation during cooking. Mechanical power is advantageous insofar as metals can have a high tolerance for high oven temperatures, unlike electrical components such as motors. Additionally, electrical power requires a power source, such as a power outlet, which is typically unavailable inside an oven. An integrated electrical power source, such as a battery, can be easily comprised, or even explode dangerously, when exposed to oven temperatures.

FIG. 1 illustrates an example embodiment of an oven rotisserie 100 comprised of a cylindrical, rotatable cooking cage 104 axially supported by a first support 108 and a second support 112. Cooking cage 104 includes a circumferential, porous or perforate wall 116, suitably comprised of a metal screen or mesh which allows heated air to pass through radially. Cooking cage 100 further includes circular end caps 120 and circular end cap 124, which is also perforate, such so as to allow heated air to pass through cooking cage 104 axially. With added reference to FIG. 2, it will be noted that closed latch 128 may be opened at 128' so as to allow door 200 of to be opened to place food in a central cavity of cooking cage 104'. Example foods include foods that are relatively small and cooked in quantity. Closing of door 200 and closing of latch 128 allows for food to be secured within cooking cage 104. Drive mechanism or motor 132, suitably comprised of a wind-able spring motor, allows for continued food rotation when oven rotisserie 100 is placed in a conventional oven. Winding is suitably accomplished by rotating an outer circumference of drive mechanism 132. Any suitable spring motor may be used as will be understood by one of ordinary skill in the art.

Figure 3:
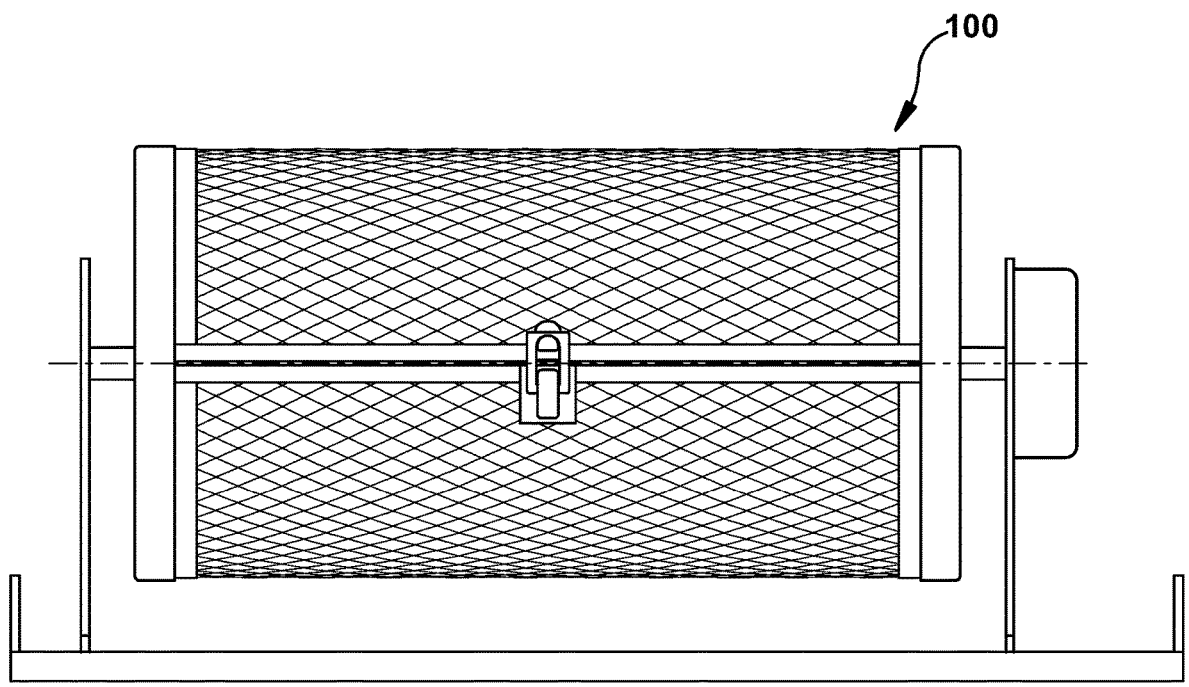
FIG. 3 illustrates a front view of the oven rotisserie of FIGS. 1 and 2.
Figure 4:
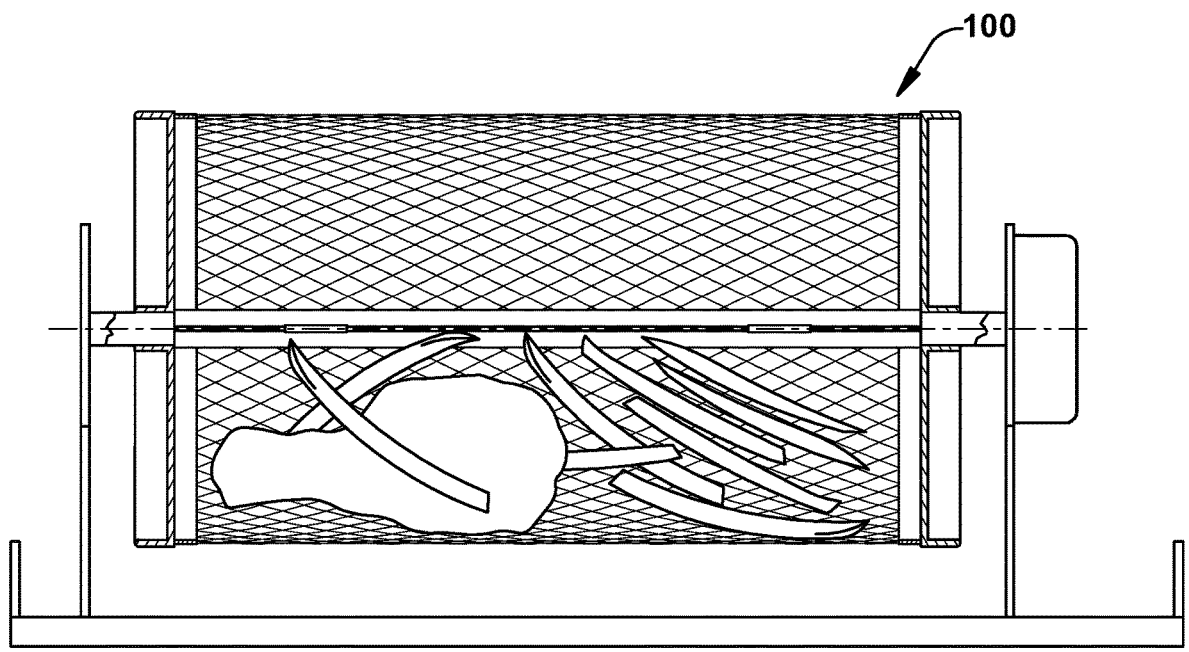
FIG. 4 illustrates a back view of the oven rotisserie of FIGS. 1 and 2.

Also included in oven rotisserie 100 is drip tray 136 that services to catch crumbs or grease resultant from the cooking process. Drip tray 136 includes first and second handles 140 and 144 which facilitate grasping to move the entire oven rotisserie 100, such as for placing it in or removing it from an oven. Front and side views of oven rotisserie 100 are illustrated in FIGS. 3 and 4. Alternatively, the drip tray suitably integrated into the oven rotisserie by being secured to a bottom of each of supports 108 and 112.

Figure 2:
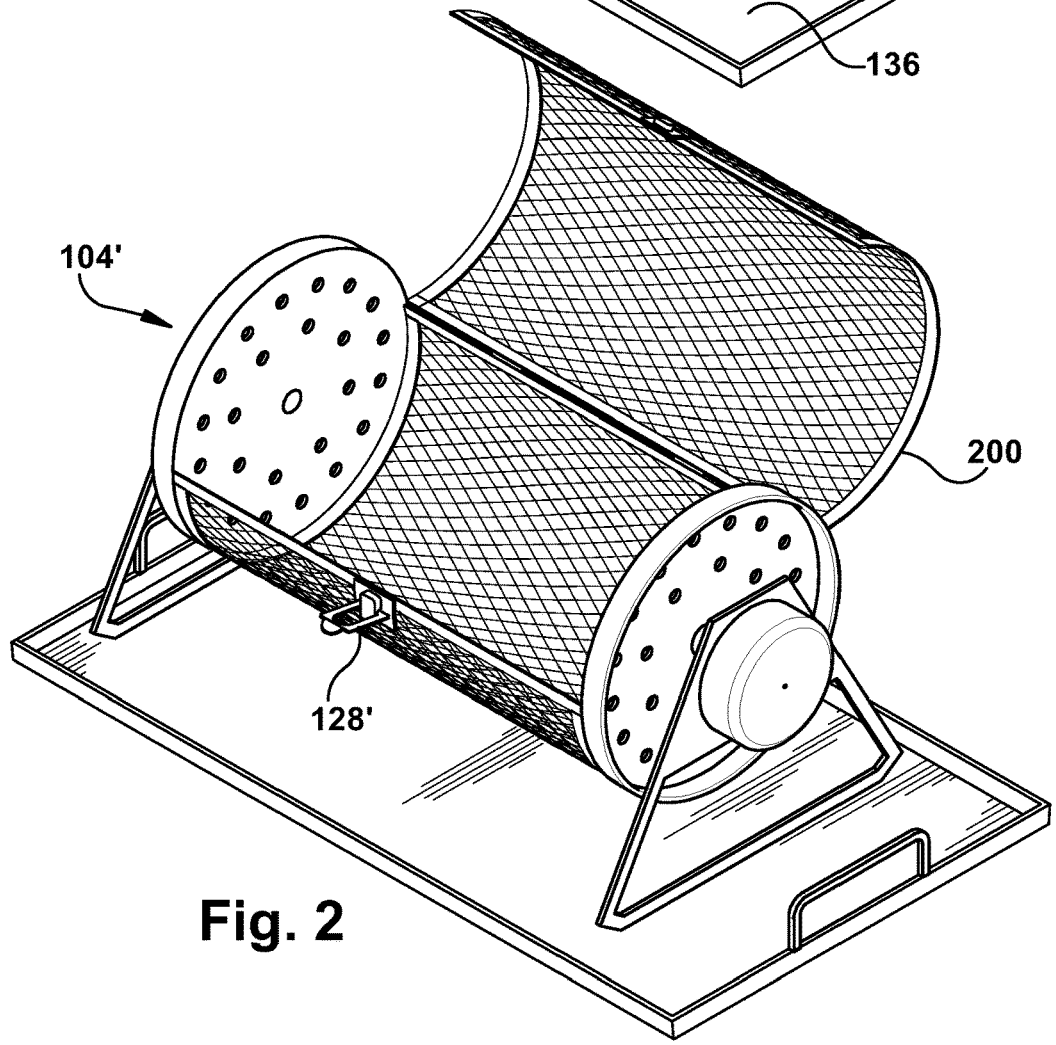
FIG. 2 is the example embodiment of FIG. 1 showing a door open orientation.

The design of the example embodiment of FIGS. 1 and 2 provides a rotisserie that can act as a tumbler for smaller food items, such as French fries, chips, or chicken nuggets. All surfaces can be intermittently exposed to hot air during the cooking process such that all surfaces are cooked fully and evenly, unlike a conventional baking operation where uneven and non-uniform cooking of individual food elements is to be expected. FIGS. 3 and 4 illustrate front and back views of the oven rotisserie of FIGS. 1 and 2.

Figure 5:
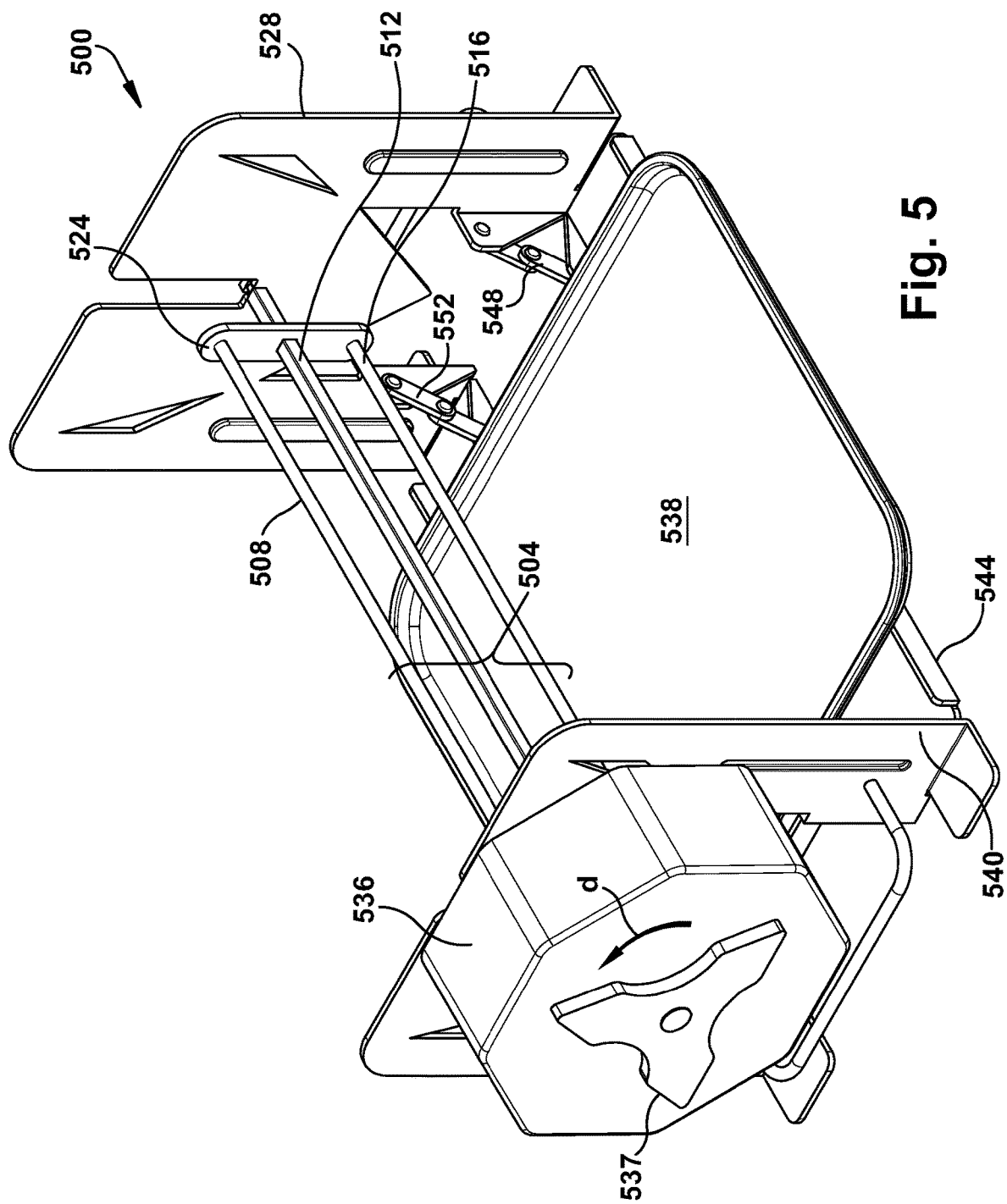
FIG. 5 is a perspective view of another example embodiment of an oven rotisserie wherein food is rotated on a spit.
Figure 6:
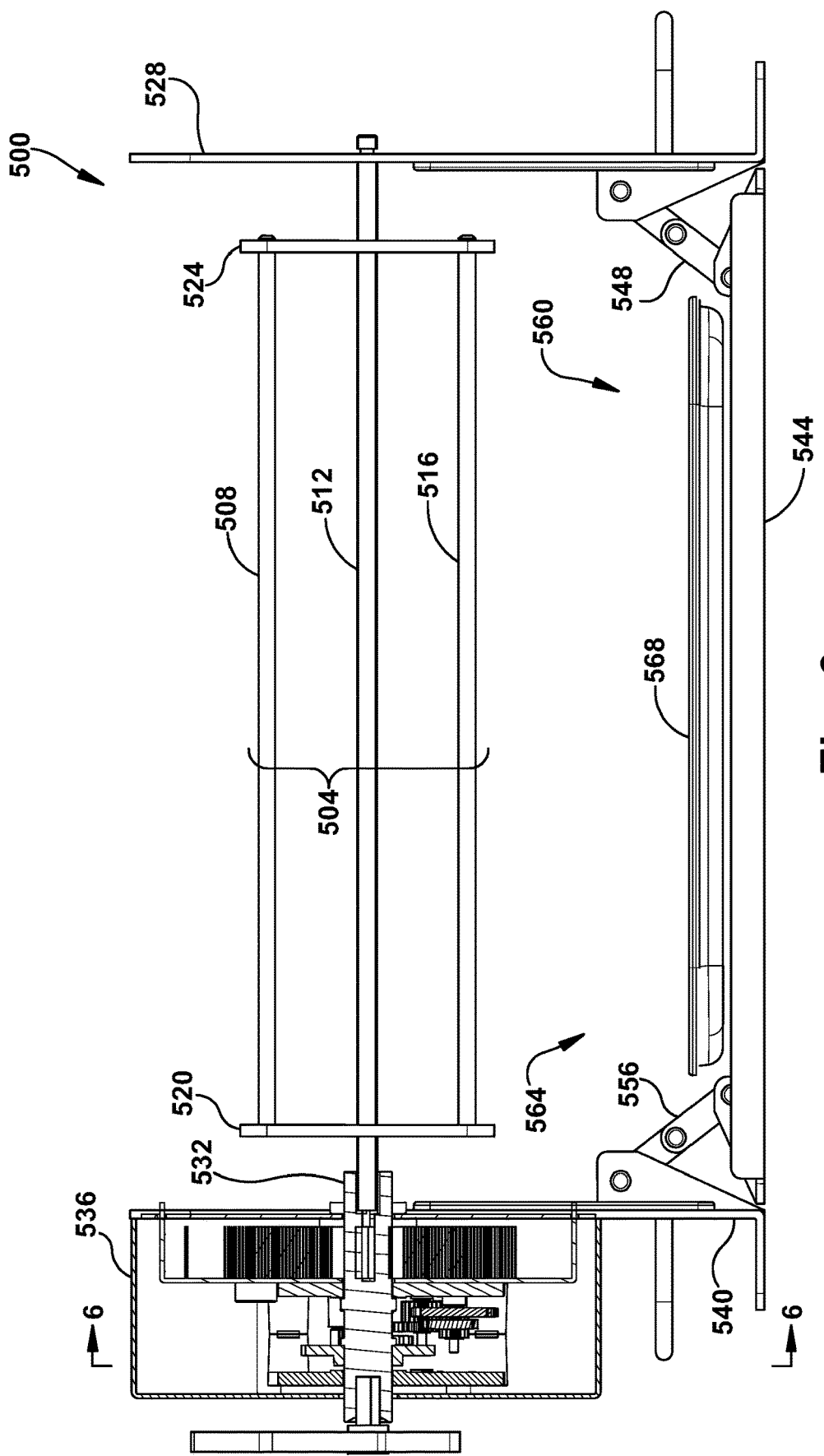
FIG. 6 a cutaway view of the oven rotisserie along line 6-6 of FIG. 5.

FIGS. 5 and 6 illustrate another example embodiment of an oven rotisserie 500 for rotating food, such as meat, as it is suspended by one spit 504. In the illustrated example, spit 504 is comprised of three parallel skewers 508, 512 and 516. Skewers 508 and 516 secured to be radially disposed from skewer 512 by supports 520 and 524. Skewer 512 forms a rotational axis about which skewers 508 and 516 rotate. Skewer 512 is pivotably and removably secured perpendicularly to support wall 528 at one end and removably affixed or coupled to a rotatable drive shaft 532 at the other end. Drive shaft 532 is configured to be rotated by drive mechanism or motor 536 which is supported by vertical side wall 540. Drive mechanism 536 is suitably wound by rotation of handle portion 537, such as in direction d.

Walls 528 and 540 are pivotably connected to base plate 544 such that in a first position, as illustrated, they are substantially parallel to one another. Connections between wall 528 and base plate 544 is via pivoting support brackets 548 and 552. Connection between wall 540 and base plate 544 is similarly via two pivoting support brackets mirroring support brackets 548 and 552, with bracket 556 being visible in FIG. 6. So constructed, walls 528 and 540 are foldable while collapsing or extending their associated support bracket to abut base plate 544 is indicated by directional arrows 560 and 564 when spit 504 is removed, thus allowing for more compact storage of rotisserie 500, and are lockable or maintainable in an open or a closed position. And the walls are positionable to remain in an opened or a closed position unless acted on by application of a sufficient pivot force. Drip tray 538 is suitably placed above base plate 544 and below spit 504 during a cooking operation of food supported by spit 504 so as to catch droplets, such as grease or water. Alternatively base plate 544 is itself configured as a drip tray obviating any need for a separate tray.

Figure 7:
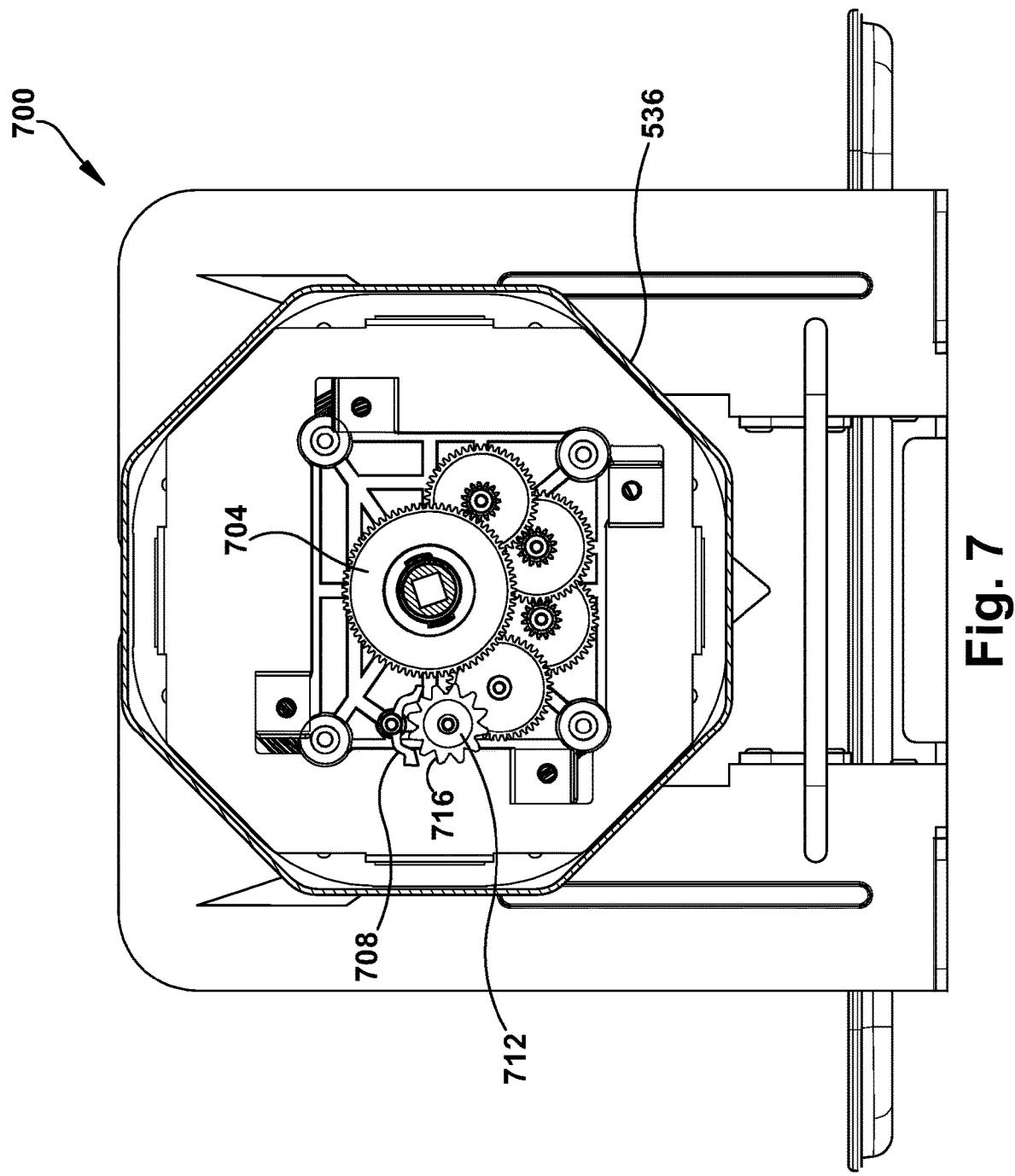
FIG. 7 is an example embodiment of a mechanical drive motor.

FIG. 7 is a cutaway side view of oven rotisserie 700 as taken from line 6-6 in FIG. 6. Illustrated in FIG. 7 is an example embodiment of drive motor mechanism 536, suitably comprising a mechanically powered drive system, such as a wind up spring motor selected with sufficient drive and geared for relatively slow rotation of food on spit 504, such as is well understood by one of ordinary skill in the art. An example of a drive mechanism may be found with a spring motor of a mechanical clock drive system. Any suitable user notification can be used to indicate that the spring motor must be rewound for continued food rotation during a cooking cycle. While a user may look into the oven and determine that rotation is stopped or slowing, or a user may no longer hear a clicking the escapement, an actual notification, such as by triggering any visual or audible signal may also be used. By way of example, an alarm, such as a ringing bell, is suitably generated at such point when cooking is ongoing but the drive mechanism is in need of rewinding, such as when a known time associated with a single rotation session indicates that additional winding is required to keep cooking. Spring motor may also be comprised of a spring system 704 which is suitably a coiled spring which may further comprise a bimetal drive mechanism, such as a bimetal coil instead of or in addition to a wind up mechanism. A suitable bimetal coil will deform when the rotisserie is placed in a heated environment, and mechanical movement induced by such deformation can impart a force to the drive mechanism.

Rotisserie rotation rate is suitably controlled by ratchet or escapement 708 acting on teeth 716 of gear 712 so as to create a rocking, periodic contact between gear teeth and escapement. Such interaction results in food rotation in stepped intervals, rather than continuous rotation. Such stepped intervals provide sufficient, regular food rotation while conserving stored motor energy.

Figure 8:
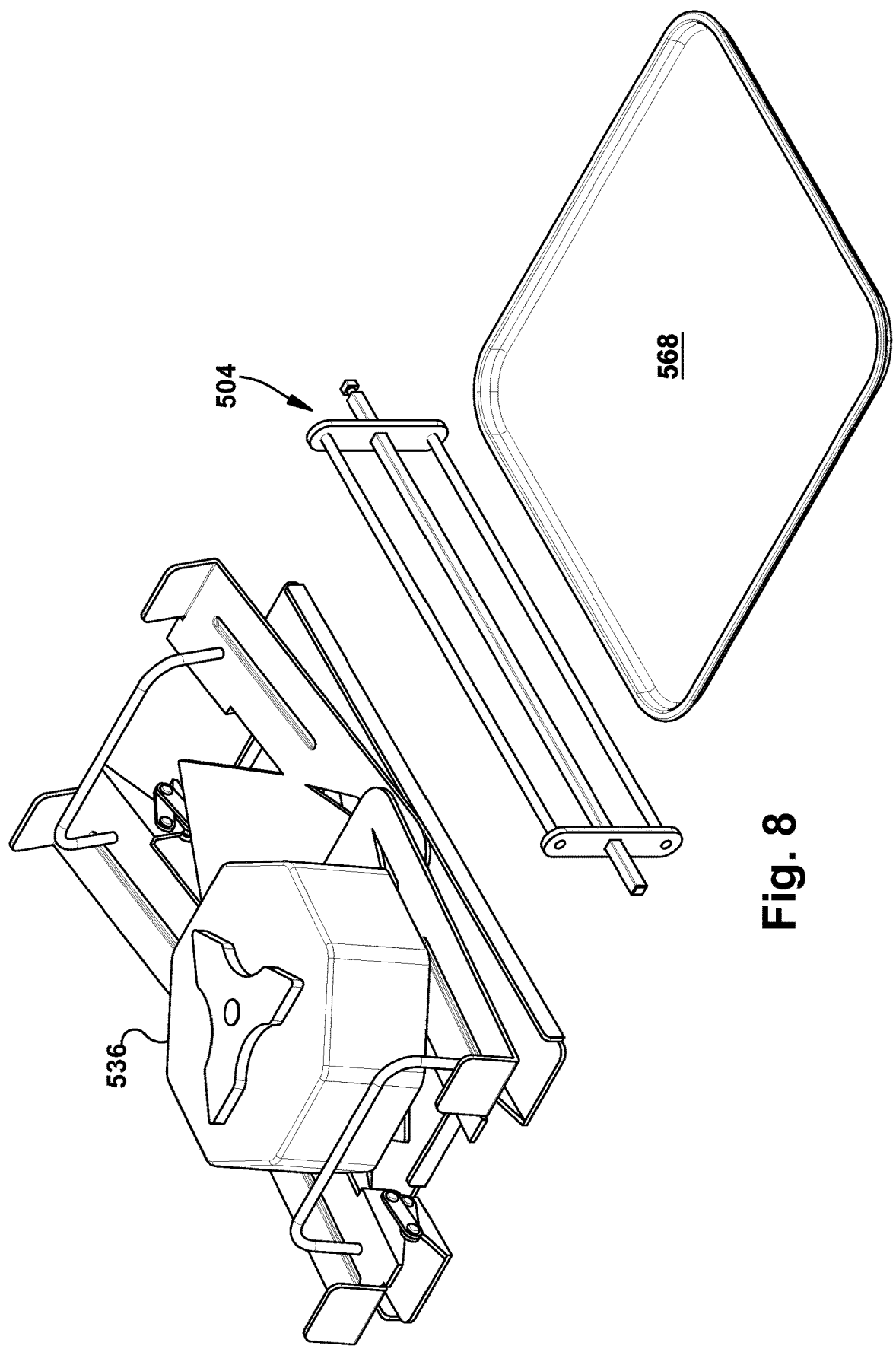
FIG. 8 an exploded view showing a spit, drip pan and drive motor of an oven rotisserie.
Figure 13:
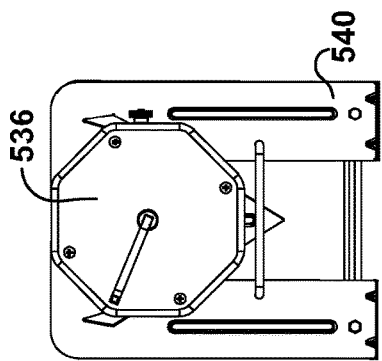
FIG. 13 illustrates another side view of an oven rotisserie.
Figure 9:
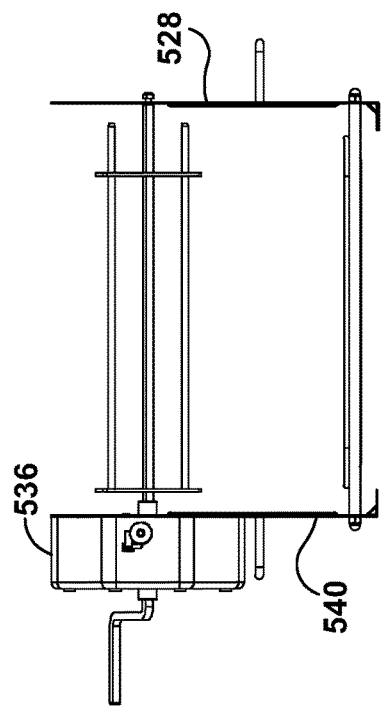
FIG. 9 illustrates a side view of an oven rotisserie.
Figure 10:
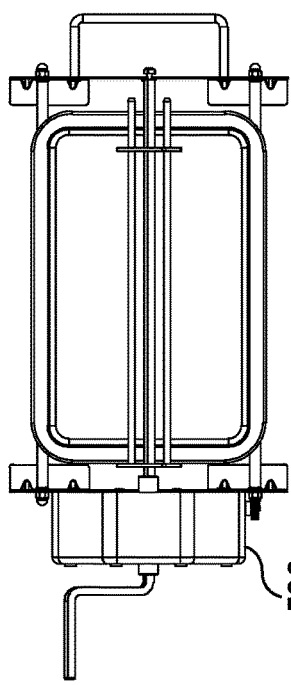
FIG. 10 illustrates a top view of an oven rotisserie.
Figure 11:
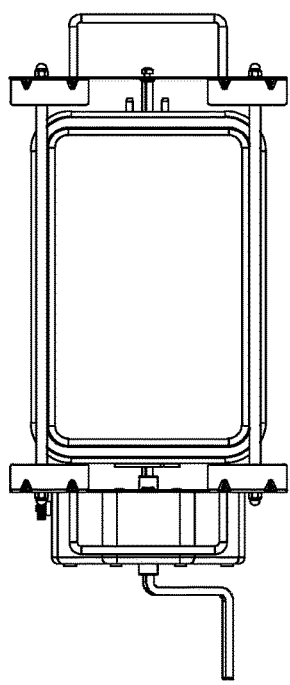
FIG. 11 illustrates a bottom view of an oven rotisserie.
Figure 12:
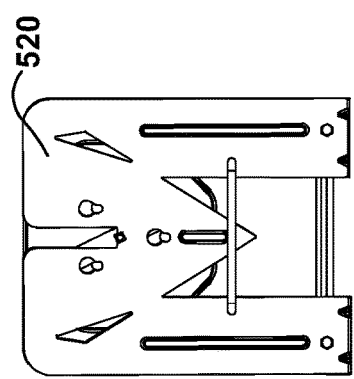
FIG. 12 illustrates a side view of an oven rotisserie.

FIG. 8 is an exploded view showing spit 504, drip pan 508 and drive mechanism 536. FIGS. 9-13 illustrated side, top and bottom views of oven rotisserie 500.

Figure 14:
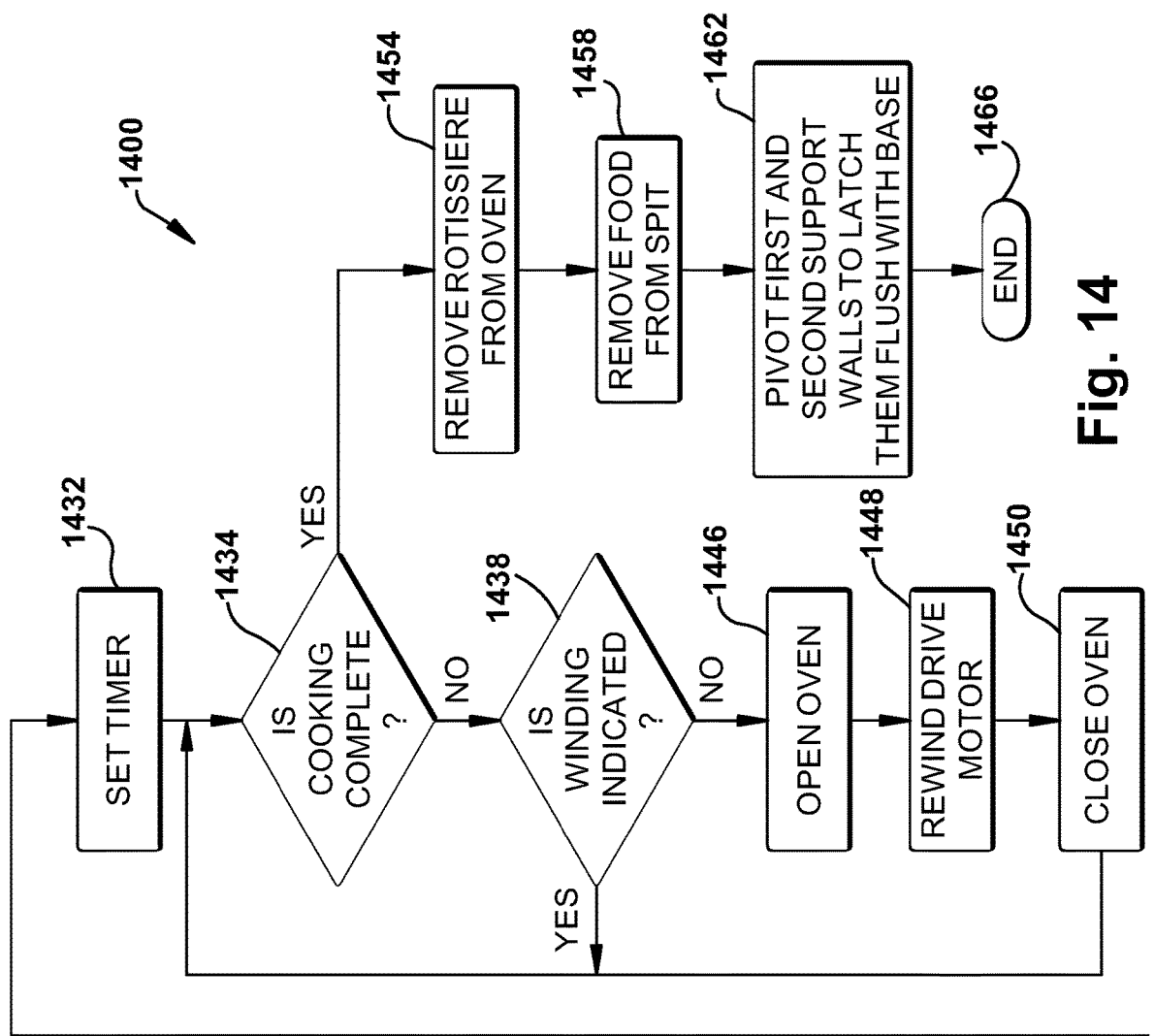
FIG. 14 is a flowchart of an example embodiment of a cooking process using an oven rotisserie system.
Figure 14:
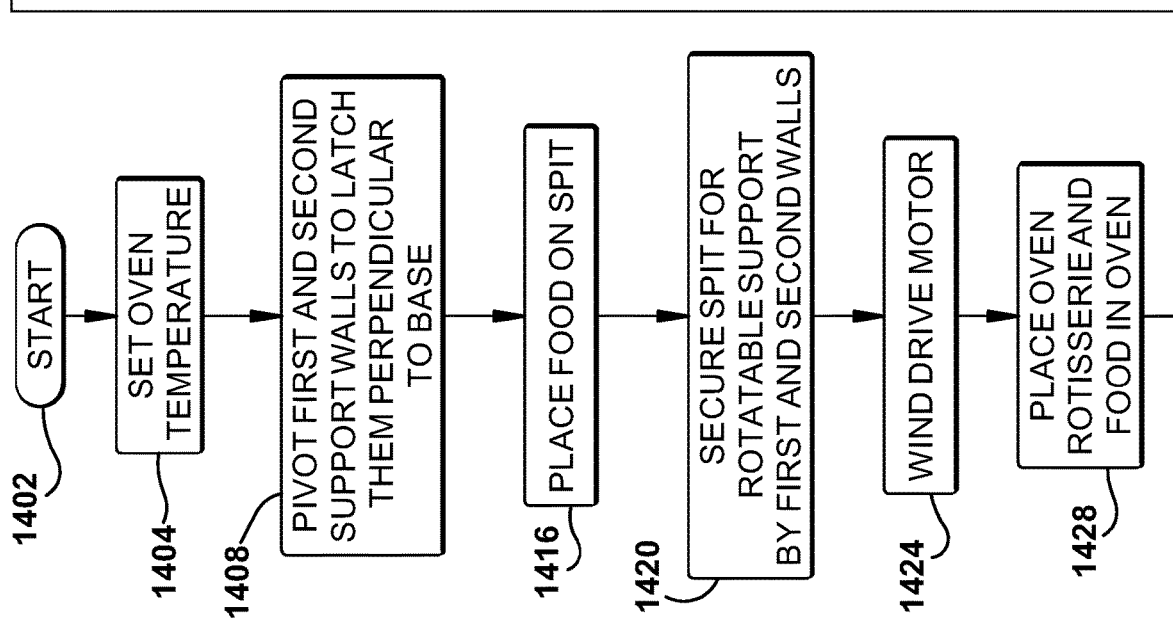

FIG. 14 is a flowchart 1400 of an example embodiment of a cooking process using an oven rotisserie system. The process commences at block 1402 and proceeds to block 1404 where a user sets an oven temperature. Next, at block 1408, the oven rotisserie is set from a storage position to a cooking position by pivoting first and second support walls to extend an associated latch mechanism to main their position perpendicular to a base. Food is placed on a spit at block 1416, and the spit is secured for support by the first and second walls at block 1420. A wind-up motor is wound at block 1424 and the rotisserie and mounted food are placed in an oven at block 1428. A timer is set at block 1432 and the food starts cooking. A test is made to determine if cooking is complete at block 1434. If not, a test is made at block 1438 as to whether a user notices that a rewinding is necessary, suitably triggered by a timer or other alarm. If no rewinding was needed as determined by block 1438, the process returns to block 1434. If rewinding is needed, the oven is opened at block 1446 and the motor rewound at block 1448. This may be done while the rotisserie is in the oven or it may be removed to avoid possible contact with hot oven surfaces. Rewinding may be done with any suitable heat insulated contact surface, either formed on the winding mechanism or held by the user, such as an oven mitt, towel, or the like. Once rewound and with the rotisserie in the oven, the oven door is closed at block 1450 and the process returns to block 1434. If cooking is complete as determined by block 1434, the rotisserie is removed from the oven at block 1454, and food is removed from the spit at block 1458, and the oven rotisserie is placed in storage position at block 1462 by pivoting the support walls to be flush with the base and collapse an associated latch to hold the walls and base relative to this position. The process ends at block 1466.

Figure 15:
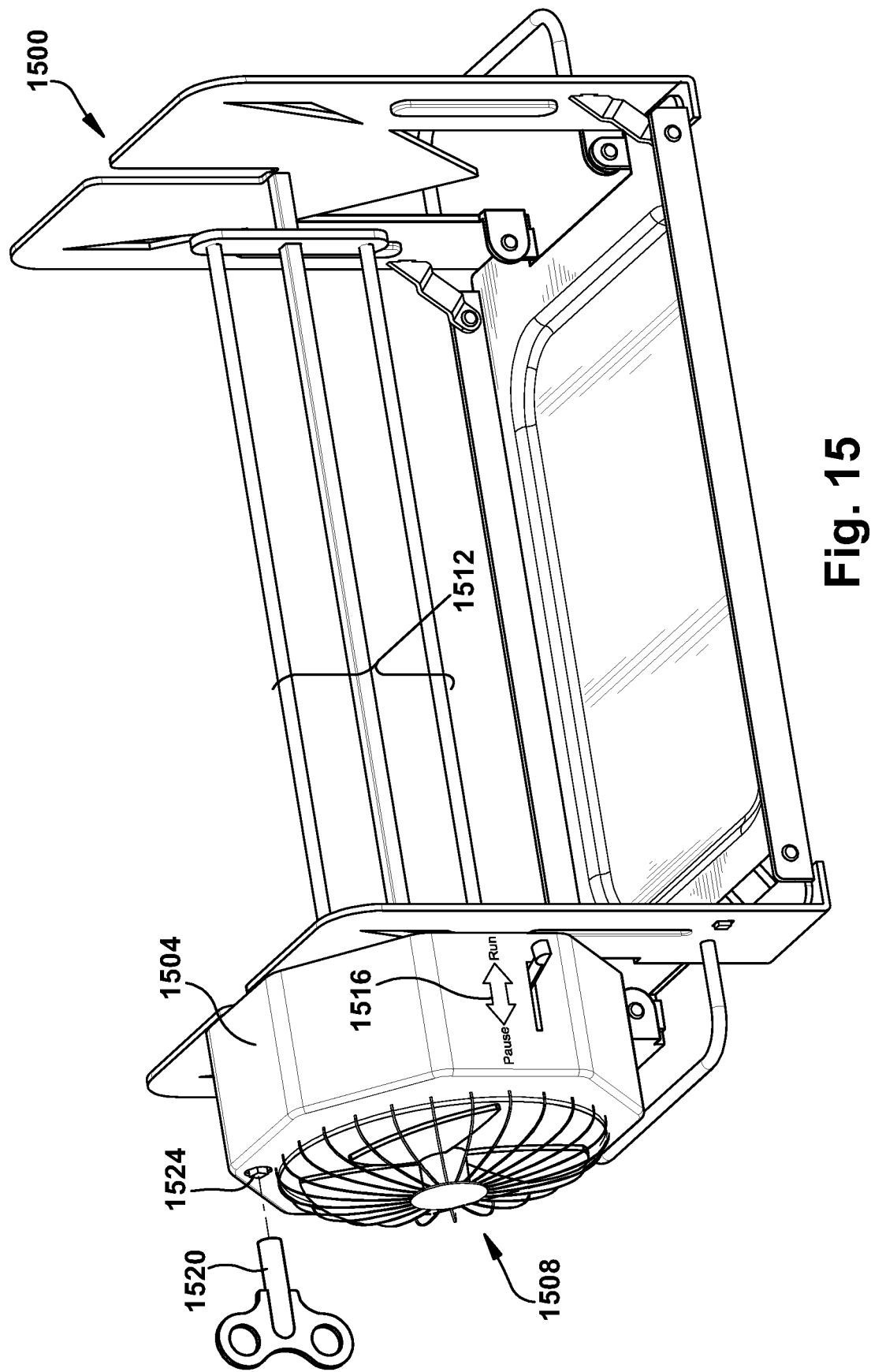
FIG. 15 is a perspective view of another example embodiment of an oven rotisserie.

FIG. 15 illustrates another example embodiment of an oven rotisserie 1500 wherein drive mechanism or motor 1504 also powers a fan 1508 suitably geared for continuous rotation at a substantially faster rate than that of spit 1512. In this example embodiment, oven rotisserie 1500 functions to circulate oven air for convection heating of food, particularly in non-convection ovens. With convection cooking, cook times can be lessened and/or oven temperature lowered. Also baking without convection can lead to uneven browning because of hot spots in the oven.

The example embodiment of FIG. 15 also illustrates a switch 1516 that suitably stops and starts operation of drive mechanism 1504, such as when it is being loaded into or removed from an oven, thus minimizing noise and motion while in transit, while also conserving stored mechanical energy. In the example, drive mechanism 1504 is wound by a removable key 1520 operable on shaft end 1524.

Figure 16:
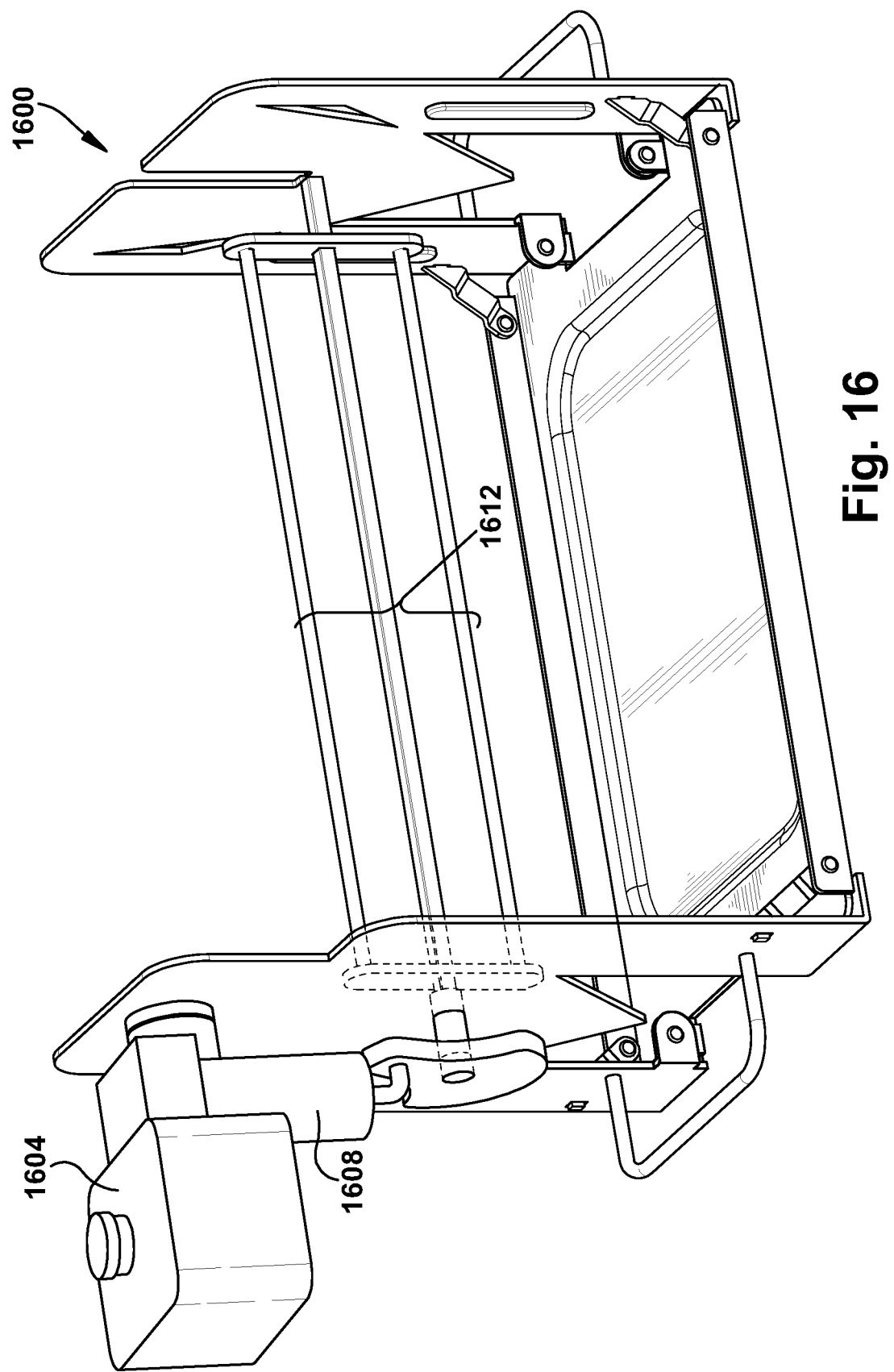
FIG. 16 is a perspective view of another example embodiment of an oven rotisserie.

FIG. 16 is another example embodiment of oven rotisserie 1600 powered by compressed gas or steam. Reservoir 1604 is suitably filled with compressed air, such as via a pump or CO2 canister. Pressure from reservoir 1604 is suitably used to power drive mechanism or motor 1608 to rotate spit 1612. Alternatively, reservoir 1604 may be filled with water. Once oven rotisserie 1600 is place in an oven, typically set well above the boiling point of water. When heated, water in reservoir 1604 turns to steam to power drive mechanism 1608. Release of steam after use in powering rotation of spit 1612 can also advantageously add moisture, and even steam cooking, to an oven interior and exposed food. Steam can assist in heating the food while simultaneously keeping moister both internally and along food surfaces.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A self-powered oven rotisserie system comprising:
   a first support, the first support including a base member, a first side member extending upwardly from a first end of the base member, a second side member extending upwardly from a second end of the base member, and a support body portion connected to the first side member and the second side member, the support body portion having an interior side and an exterior side, the exterior side of the support body portion being oppositely disposed relative to the interior side of the support body portion, the first side member being spaced apart from the second side member by an opening beneath the support body portion;
   a second support;
   a food support having an axis pivotably secured between the first support and the second support, the food support extending outwardly from the interior side of the support body portion of the first support, the food support configured to secure an associated food item;
   a drip tray disposed between the first support and the second support;
   a horizontal base pivotally connected to the first and second supports at opposite ends configured such that both the first and second supports are inwardly foldable toward one another;
   a heat tolerant mechanical drive motor connected to one end of the food support, the drive motor configured to impart a rotational force about the axis of the food support via a gear;
   the drive motor attached to the exterior side of the support body portion of the first support;
   the drive motor configured to be powered by a manually wound spring;
   the drive motor further configured with an escapement in periodic contact with teeth of the gear to rotate the food support in stepped intervals, rather than in continuous rotation, so as to conserve stored motor energy; and at least one first pivoting support bracket configured to maintain the first support in an open or closed position.

2. The system of claim 1 wherein the food support is comprised of a removable spit secured to the first and second supports at distal ends thereof.

3. The system of claim 2 wherein the spit is comprised of two or more parallel skewers.

4. The system of claim 1 wherein the second support includes a base member, a first side member extending upwardly from a first end of the base member, a second side member extending upwardly from a second end of the base member, and a support body portion connected to the first side member and the second side member, the first side member being spaced apart from the second side member by an opening beneath the support body portion.

5. The system of claim 1 further comprising at least one second pivoting support bracket configured to maintain the second support in an open or closed position.

\* \* \* \* \*